United States Patent [19]

Benton

[11] 4,454,414
[45] Jun. 12, 1984

[54] FUNDS TRANSFER SYSTEM USING OPTICALLY COUPLED, PORTABLE MODULES

[75] Inventor: William M. Benton, Ft. Lauderdale, Fla.

[73] Assignee: Vericard Corporation, Fort Lauderdale, Fla.

[21] Appl. No.: 391,599

[22] PCT Filed: Apr. 5, 1982

[86] PCT No.: PCT/US82/00421
§ 371 Date: Jun. 16, 1982
§ 102(e) Date: Jun. 16, 1982

[87] PCT Pub. No.: WO83/03694
PCT Pub. Date: Oct. 27, 1983

[51] Int. Cl.³ .............................................. G06F 15/30
[52] U.S. Cl. ..................... 235/379; 235/380; 235/381; 235/383; 235/491; 340/825.35; 194/DIG. 26; 364/406
[58] Field of Search ............... 235/379, 380, 383, 381, 235/491, 494, 432; 340/870.02, 870.29, 825.35, 825.33; 194/DIG. 9, DIG. 26; 364/401, 403, 404, 406, 408; 250/555

[56] References Cited

U.S. PATENT DOCUMENTS

| 3,938,090 | 2/1976 | Borison et al. | 340/149 A |
|---|---|---|---|
| 4,007,355 | 2/1977 | Moreno | 235/379 |
| 4,110,606 | 8/1978 | Prince et al. | 235/432 |
| 4,120,452 | 10/1978 | Kimura et al. | 235/381 |
| 4,179,064 | 12/1979 | Yoshioka et al. | 235/381 |
| 4,201,907 | 5/1980 | Otten | 235/381 |
| 4,213,119 | 7/1980 | Ward et al. | 340/151 |
| 4,224,666 | 9/1980 | Giraud | 364/200 |
| 4,277,837 | 7/1981 | Stuckert | 364/900 |
| 4,305,059 | 12/1981 | Benton | 340/825.33 |
| 4,341,951 | 7/1982 | Benton | 235/379 |

FOREIGN PATENT DOCUMENTS

| 006422 | 9/1981 | France | 235/380 |
|---|---|---|---|
| WO81/00015 | 1/1980 | PCT Int'l Appl. | 235/379 |

Primary Examiner—A. D. Pellinen
Assistant Examiner—Robert Lev
Attorney, Agent, or Firm—Lowe, King, Price & Becker

[57] ABSTRACT

A system for transferring funds in lieu of cash or other data comprises portable funds transfer modules issued by a bank or other financial institution and carried by each member who may be a vendee or vendor. A first type module (20) comprises a housing (22) containing a keyboard (24) for entering data, a display (26) and a switch (30) for identifying data type. Within the housing (22) is signal processing and storage circuitry, and an optical transceiver (32, 34), coupled to the circuitry, is exposed through the housing. A second type module (42) has a housing (44) that is smaller than the housing of the first type module and includes only the internal circuitry and exposed optical transceiver (48, 50); there is no display or keyboard. The housings of the first and second type modules are provided with alignment members (36, 38, 40, 52, 54) to (a) orient pairs of the first type module with corresponding optical transceivers in alignment with each other for data transfer or (b) orient first and second type modules with each other for data transfer. In the second case, data stored in the second type module (42) is displayed in the display of the first type module (20). An optional alignment pad (56) may be used to properly position modules for data transfer. A second type of mounting pad (90) may be retrofitted to external equipment, such as an automatic teller machine (ATM), to provide funds transfer directly with a member institution.

13 Claims, 14 Drawing Figures

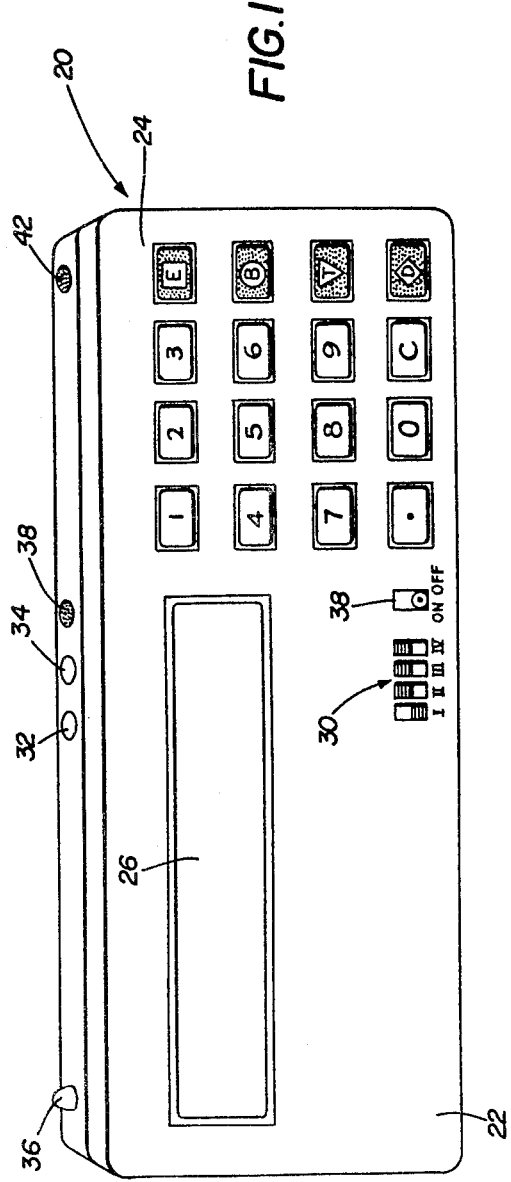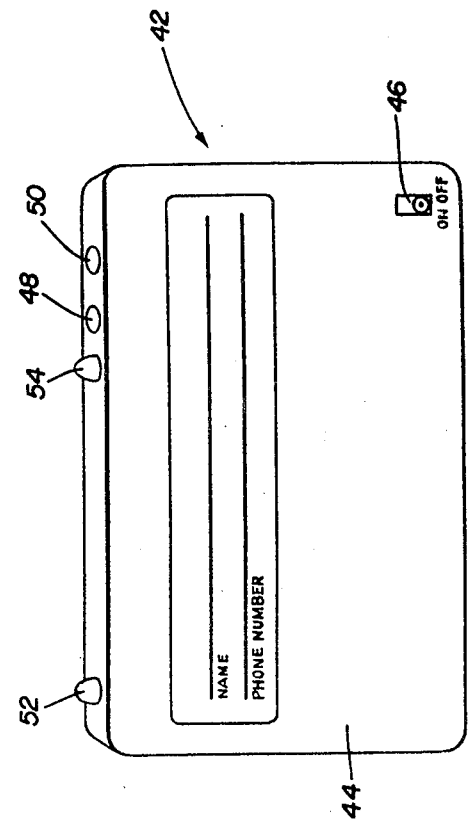

FUNDS TRANSFER SYSTEM USING OPTICALLY COUPLED, PORTABLE MODULES

CROSS REFERENCE TO RELATED APPLICATIONS

This invention is related to the subject matter of application Ser. No. 109,332, filed on Jan. 3, 1980, and now U.S. Pat. No. 4,305,059, and application Ser. No. 166,689, filed on July 2, 1980.

FIELD OF THE INVENTION

The present invention relates generally to electronic off-line data transfer, and more particularly toward a funds transfer system comprising a number of portable funds data storage and transfer modules using optical coupling for performing cashless transactions.

BACKGROUND ART

Spurred by the pressures of paper-based checking which is costly and time consuming for financial institutions and further in light of the inconvenience of maintaining accurate accounting in cash transactions, in addition to risk of theft and loss, financial institutions have sought out and experimented with various electronic means of expanding and speeding up a customer's accessibility to his accounts. To promote account accessibility and improve record keeping as well as to reduce flow of actual cash, computer technology has been applied to develop electronic funds transfer, which is essentially a process of value exchange achieved through the use of electronic devices. Examples of electronic funds transfer equipment that have become used on a substantial basis in recent years are the automated clearing house (ACH), the automated teller machine (ATM) and the point of sale system (POS).

Early electronic funds transfer (EFT) systems have been on-line (that is, in communication with a central computer). There has been a trend, however, to provide off-line electronic funds transfer to eliminate the presence of the central computer in every transaction.

In Moreno U.S. Pat. No. 4,007,355, for example, cashless transactions are made between credit cards through a special interface apparatus located at the vendor station. The cards themselves contain fund data storage capability, but data input and control are provided by the interface. No exchange of funds may be made arbitrarily; because the cards have no keyboards, there must be an interface apparatus present or the cards are useless.

In Stuckert U.S. Pat. No. 4,277,837, a cashless, off-line transaction system involves personal, portable terminals that are adapted for use with data storage and transfer cards. The terminals exchange data with the cards and with other terminals using capacitive coupling. Because the card has no keyboard or display, each individual must have separate cards and terminals whereby the card is carried and applied to the terminal of a vendor to make a transaction. To thereafter read the data contained on the card, the member must have access to his terminal; he cannot continuously monitor his account, and versatility of the system is limited.

In my U.S. Pat. No. 4,305,059, I have provided a system of identical funds transfer modules that are issued by a bank and carried by each member. The module contains a keyboard, a display and electronic circuitry for processing and storing transaction data. Funds are transferred between modules by establishing an electrical connection between modules using a plug or cable. Although generally satisfactory, the establishment of electrical connections between modules tends to be inconvenient and somewhat unreliable. Also, the versatility of this system is limited; it cannot be easily applied to perform data exchange with such equipment as automatic teller machines, charge-telephones, utility metering equipment, etc.

DISCLOSURE OF INVENTION

One object of the invention, therefore, is to provide a new and improved electronic funds transfer system.

Another object is to provide an electronic funds transfer system, wherein data transfer is established without hard wire coupling.

Another object is to provide an electronic funds transfer system including portable, funds transfer modules that employ optical coupling for data exchange and which can be incorporated within or retrofitted to external electronic funds transfer equipment, such as (ATM).

Another object is to provide an electronic funds transfer system, wherein different types of transactions are stored in different memories or different portions of a memory to avoid account comingling.

Another object is to provide an electronic funds transfer system, including pluralities of first and second types of portable data storage and transfer devices or modules, wherein the first type contains data processing, keyboard entry and display as well as optical coupling to other portable devices and the second, economy type employs only optical coupling, and wherein pairs of the first type of portable module are aligned with each other for funds transfer via optical coupling and wherein the first and second type modules may be aligned for funds transfer via optical coupling.

An other object is to provide an electronic funds transfer system, wherein each member of the system carries a portable electronic funds transfer module, wherein at the point of transaction, a pair of the modules are properly positioned within an alignment pad to enable funds to be transferred between the modules via an optical coupling link.

In accordance with the invention, each member of a cooperative is provided with at least one of a first or second type of electronic portable data processing and storage module. Each module contains funds transfer data representing an account balance and a credit limit established by the authorizing entity of the cooperative. During a transaction, modules carried by the members are mated, and data transferred between the two in accordance with the amount of the transaction.

The first type of module comprises a housing, signal processing and storage circuitry within the housing, a keyboard on the housing for entering data and a display. A first optical transceiver means, coupled to the internal circuitry, is exposed through the housing. A switch on the housing enables the member to select the particular memory or memory portion of the internal signal processing and storage circuitry to be involved in the transaction.

The second type portable module includes a second housing smaller in size than the housing of the first type module, internal signal processing and storage circuitry and a second optical transceiver means coupled to the internal circuitry and exposed through the second housing. The housings of both the first and second type modules contain alignment members to enable pairs of first type modules to be oriented with respective optical transceiver means in optical alignment with each other and to orient first and second type modules with the first transceiver means of the first type module in optical alignment with the second transceiver means of the second type module.

A first type of alignment pad receives a pair of first type modules and, together with the housing alignment means, maintains the two modules in proper orientation to complete a transaction. Account transfer data, including identification and account numbers, transaction date, transaction amount and account balances, are displayed as the transaction takes places. The alignment pad also receives a first type module and a second type module to maintain them in proper orientation for funds transfer. In this case, the display of the first type module displays the transaction amount and account balance maintained in the second type module as well as displays other data. In this class of transaction, the account balance stored in the second type module may be incremented as well as decremented by the first type module.

A second type of mounting pad may be secured to external equipment, such as an ATM, to receive the first or second type modules. The second type of alignment pad contains an optical coupling transceiver in alignment with the optical transceiver of the module. This alignment pad can thus be used to establish funds transfer between the module and a financial institution, and can further be used in myriad other applications, such as payment of utility bills, funds data transfer over the telephone or telegraph lines or making gasoline or other purchases at the point of sale without human vendor intervention.

Still other objects and advantages of the present invention will become readily apparent to those skilled in the art from the following detailed description, wherein I have shown and described only the preferred embodiments of the invention, simply by way of illustration of the best mode contemplated by me of carrying out my invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

FIG. 1 is a perspective view of a portable, electronic funds data transfer module of a first type, in accordance with the invention;

FIG. 2 is a perspective view of a module of a second type, in accordance with the invention;

BEST MODE FOR CARRYING OUT THE INVENTION

Figure 3:
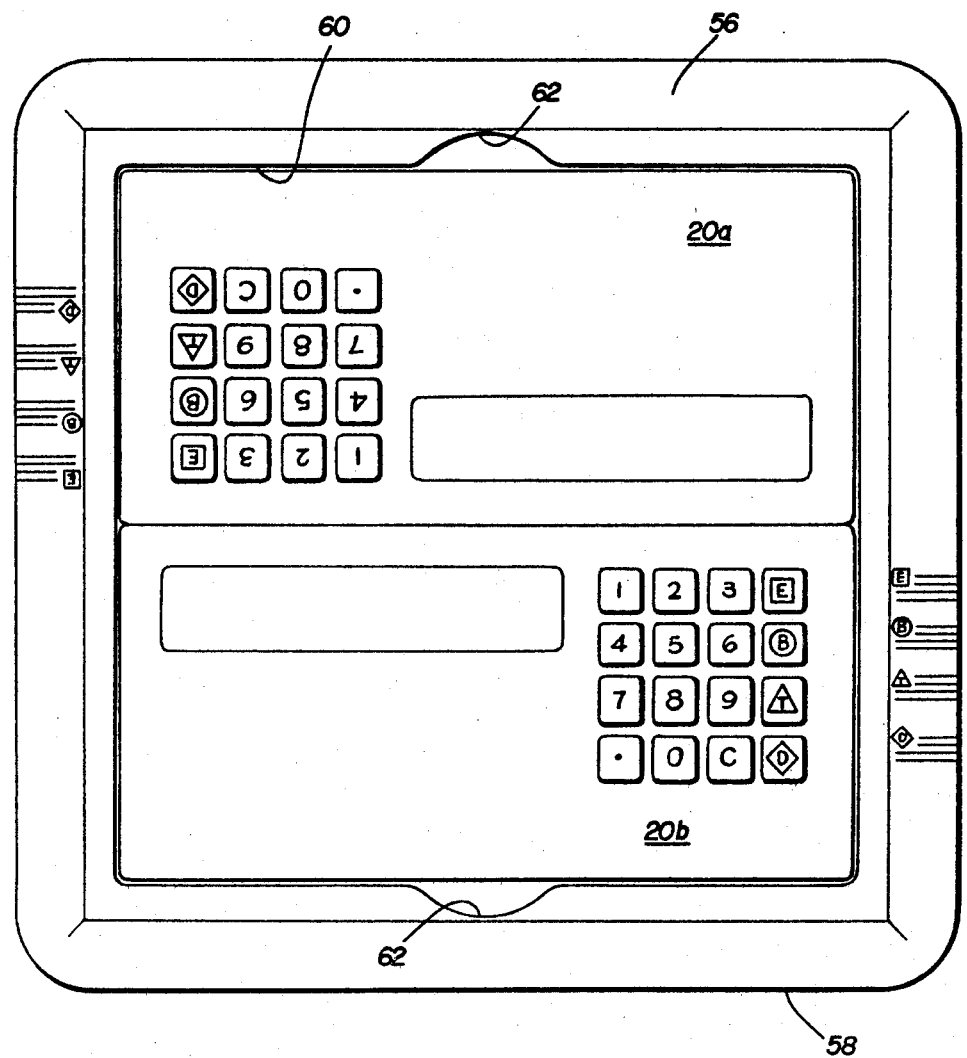
FIG. 3 is a top view of an alignment pad containing a pair of first type transaction modules in position for completing a transaction.

Referring to FIG. 1, a first type of funds data transfer device or module 20, in accordance with the invention, comprises a housing 22 preferably formed of impact-resistant plastic, carrying a keyboard 24 and an alphanumeric display 26. The keyboard 24 includes a number of digit keys 1-9, a decimal key and a clear key C. These keys are conventional. In addition, however, the keyboard 24 includes an enter key E to enable account and other data entered by keyboard to be accepted for data processing within the module 20, a balance key B to display account balance, a transaction key T to complete a requested transaction (to be discussed in more detail below) and a date key to enable the date of transaction to be updated by keyboard.

The module 20 contains electronic circuitry of a very low power dissipation type, such as CMOS, and an ON/OFF switch 28 selectively connects and disconnects the internal battery from the circuitry. The circuitry contains memory that is non-volatile, so that stored data is not lost when the module 20 is turned off.

A number of switches 30 on the housing 22 enables a transaction or keyboard entered data to be processed with respect to only predetermined memories or predetermined portions of a memory within the circuitry (to be described in detail below) and enables transactions to be maintained separately among different accounts without comingling.

In addition to data entry through keyboard 24, an optical transmitter 32 and optical receiver 34, exposed through housing 22, establish a data link between circuitry within the housing 22 and an external data source, such as another funds transfer module.

On the outer surface of housing 22 are provided a number of alignment elements, including a male alignment element 36 at one end of the housing, a first female element 38 at a central portion of the housing and a female element 40 at the opposite end. These elements mate with complementary alignment elements in an identical module or on a smaller, economy module 42 (FIG. 2) to be described below. At this point, however, it is noted that electronic data and other data are bidirectionally transferred between module 20 in FIG. 1 and other modules by establishing an optical data link through optical transmitter 32 and optical receiver 34, with elements 36, 38 and 40 orienting the modules so that the corresponding optical transmitters and receivers of the two modules are in proper optical alignment with each other.

Referring to FIG. 2, a second type of module 42, in accordance with the invention, has a housing 44 that is smaller than housing 22 of module 20 in FIG. 1. The module 42 contains signal processing and storage circuitry within housing 44 as well as a battery (not shown) for powering the circuitry. The battery is controlled by an external ON/OFF switch 46 exposed through the housing. Also exposed through the housing are an optical transmitter 48 and an optical receiver 50. Disposed on a side of housing 44 with the optical couplers 48, 50 are male alignment elements 52 and 54. It is noted that when the module 42 in FIG. 2 and module 20 in FIG. 1 are positioned to face one another in the manner shown in FIG. 6, alignment element 52 is coaxial with alignment element 40, alignment element 54 is coaxial with alignment element 38 and the optical couplers 48, 34 as well as 50, 32 are in optical alignment. It is further noted that when a pair of the modules 20 are oriented with one another in the manner shown in FIG. 3, male element 36 of one module will mate with female element 40 of the second module, female element 40 of the first module 20 will mate with the complementary male element 36 of the second module, and the optical transmitter 32 will be in alignment with the receiver 34 of the second module while the transmitter 32 of the second module is in optical alignment with the optical receiver 34 of the first module. Female alignment element 38 is not used.

Considering now the operation of module 20 (FIG. 1) in more detail, each member of a cooperative carries one of the modules which has previously been initialized at the authorizing entity, e.g. bank, to have an account balance. For example, the account balance may represent a withdrawal made at the bank or may represent a line of credit. The module 20 contains microprocessor based circuitry, to be described below, including read only memory (ROM) within which is stored a personal identification number (PIN) known only to the authorized holder of the module 20 and other data. The circuitry also includes random access memory (RAM) adapted to receive data entered to the module 20 through keyboard 24 as well as through optical coupler 32, 34. Display 26, responsive to the circuitry, displays the personal identification number, transaction amount and account balance as well as other data as programmed within the microprocessor, as described below. Of particular importance, the portion of the RAM into which transaction data are stored and retrieved for any particular transaction depends upon the position of a variable position switch 30, set by the user prior to each transaction.

Figures 4, 5:
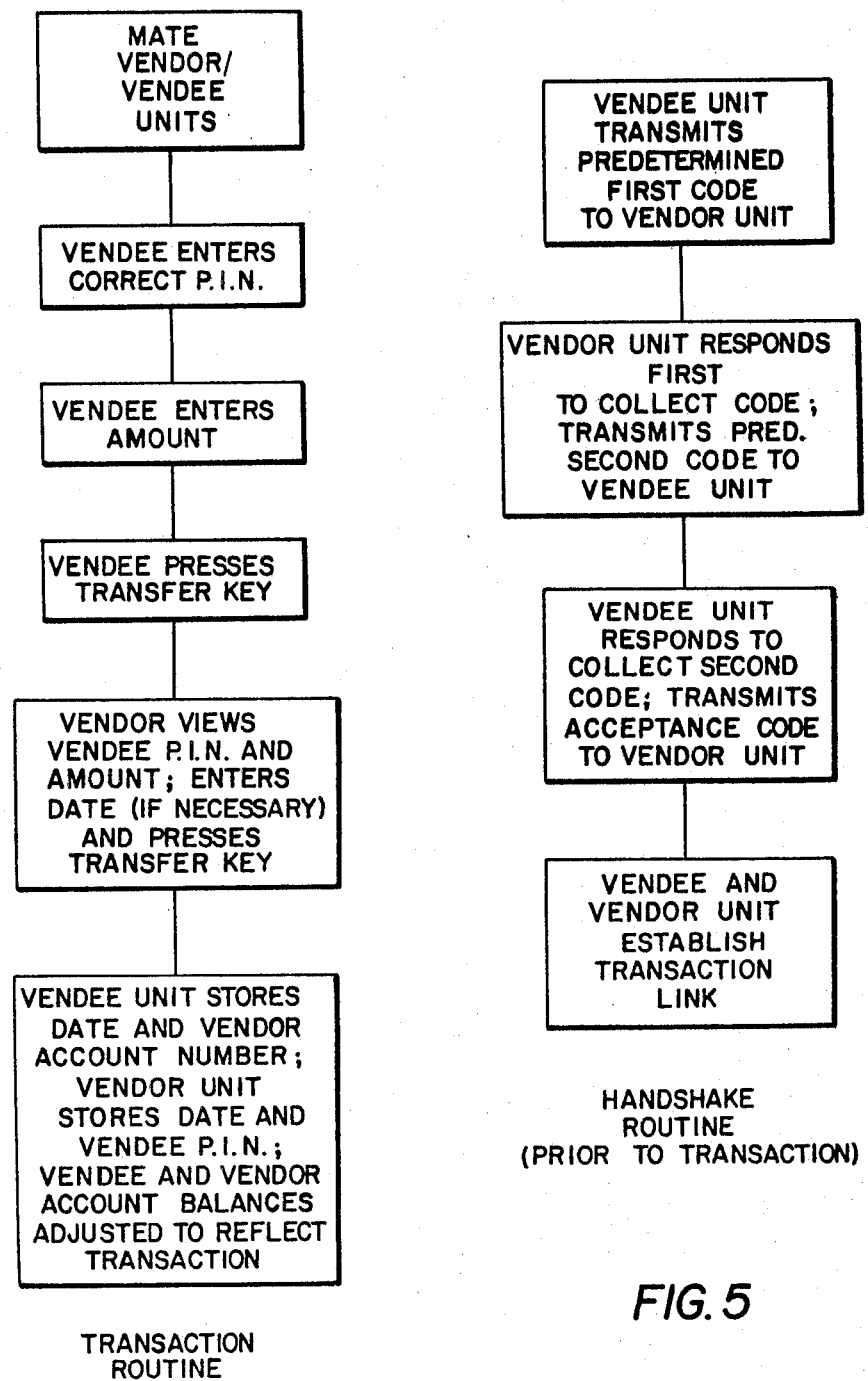
FIG. 4 is a flow diagram of a transaction routine for completing a transaction between a vendor and a vendee.
FIG. 5 is a flow diagram of a handshake routine that occurs prior to the transaction.

The operation of module 20 in a typical commercial environment shall be described with reference to FIGS. 3–5. In FIG. 3, 56 designates an alignment pad having a sidewall 58 within which is defined a recess 60 configured to receive two of the modules 20 of FIG. 1, designated for convenience in FIG. 3 as 20a and 20b, respectively. The alignment pad 56 is adapted to be retained by a vendor at a point of sale to be presented to the vendee prior to each transaction. To make a transaction, the vendor module 20a and 20b are first mated together so that male element 36 of one module mates with female alignment element 40 of the other module, et cetera. The two modules are lowered into the recess 60, using the thumb recesses 62 to enable the user to maintain the two modules together until they are seated within the pad. With both modules turned on via switch 28 (not shown in FIG. 3), and referring to FIG. 4, the vendee first enters the personal identification number that was issued to him with the module. Following entry of each PIN, the enter key E is depressed. The keyboard entered PIN is compared with the PIN stored in masked ROM within the module 20. If the keyboard entered PIN does not match with the stored PIN, the vendee is invited, by display prompting, to make a second try. After a predetermined number of trys, unless the correct PIN is entered, the transaction is not authorized, and the vendee module may be deprogrammed by a deprogram routine stored in either module.

Assuming that the vendee enters the correct PIN, the vendee is display prompted to keyboard enter the amount of the transaction. Following entry of the correct PIN by the vendee as well as entry of the amount, the vendee presses the transfer key to forward the data to the vendor module; if there is any problem, the clear key C is depressed and new data entered by the vendee.

Following operation of the transfer key T by the vendee, the vendee PIN or other account identification data, as well as the amount of the transaction, is viewed by the vendor. The vendor now enters the present date (only if the date stored in the vendor module is not current) and presses the transfer key T indicating that the transaction is acceptable. The vendee unit stores the date and vendor account number (stored in the vendor module) while the vendor unit stores the date and vendee PIN. The vendee and vendor account balances in the two modules are adjusted to reflect the transaction. Each module stores details of the transaction. Ultimately, the modules are data unloaded at the authorizing institution or other entity to provide a hard copy printout of transaction details. This enables the vendor and vendee to maintain accurate account records as well as to trace erroneous or improper transactions.

As one level of security, the transaction is not authorized unless the vendee keyboard enters the proper PIN, issued to him with his module. As another level of security, compared with off-line systems involving the use of a card carrying a magnetic stripe, it is virtually impossible to gain access to the data stored within the internal circuitry of the modules 20. Furthermore, because the housing 20 carries alignment elements 36, 40 as well as optical couplers 32, 34 that are located at precise positions reproduction of the housing by an unauthorized entity would involve substantial expense.

As yet a further level of security, prior to entry by keyboard of any data by vendor or vendee, the modules transmit light pulses of a predetermined code at transmitter 32 to be received by receiver 34 of the other unit. The other unit is programmed to respond to that first code, and in response, generate a second code. The first unit responds to the light pulses of the second code generated by the first module and the two modules then establish a communication link for the transaction. This "handshaking" protocol is summarized in the flow diagram of FIG. 5.

The circuitry for transmitting and receiving light pulses of predetermined encoding shall be described in detail below. It is pointed out, however, that the light pulses are invisible, and preferably in the infrared frequency band, so that the light pulses cannot be visually detected. As a practical matter, however, the pulses have a repetition rate that is much too high to enable visual perception, even if the pulses were generated in the visible band.

Still referring to FIG. 1, the switches 30 enable transaction data to be processed with respect to any one of four different memories or four different portions of a single, large memory. These switches have particular utility in the invention because they enable four different accounts to be maintained separately. These different accounts can represent different levels of accounting sophistication, may represent different sources of funds or may represent different users, such as members of a family.

For example, switch 1 (hereinafter termed "tracks") may be based on the ownership of a money pool of U.S. Treasury bills to balance trading between a trade group nationally and internationally. Trading would be provided in credit, eliminating both letters of credit and check clearing operations.

Track 2 may involve trading among members of a national group, with funds being backed by nationally denominated currency.

Track 3 may involve a decrementing mode, loaded by a financial institution in cooperation with the telephone company, trains, taxis, postage and freight. This track is useful for institutional fees, including transactions dealing with children and the elderly, involving small sums of money, wherein it may not be necessary to check a personal identification number or record transaction details.

Track 4 may involve insurance data, wherein an insurance company will apply credit to the account stored in memory. The doctor or hospital is paid in credit supplied by the module, and may be used in emergency medical situations.

An additional track may involve food stamps, wherein credits are unloaded from the module by food retailers. The module is set to automatically allow a predetermined amount of credit per week to be applied toward food.

An additional track may involve performance grading, such as military or university type performance information or attendance records.

An additional track may be a standard credit track, wherein a bank inputs standby credit and enables the module to operate as a credit card, except that it uses a personal identification number, is self-verifying and interfaces with electronic funds transfer equipment.

Figure 6:
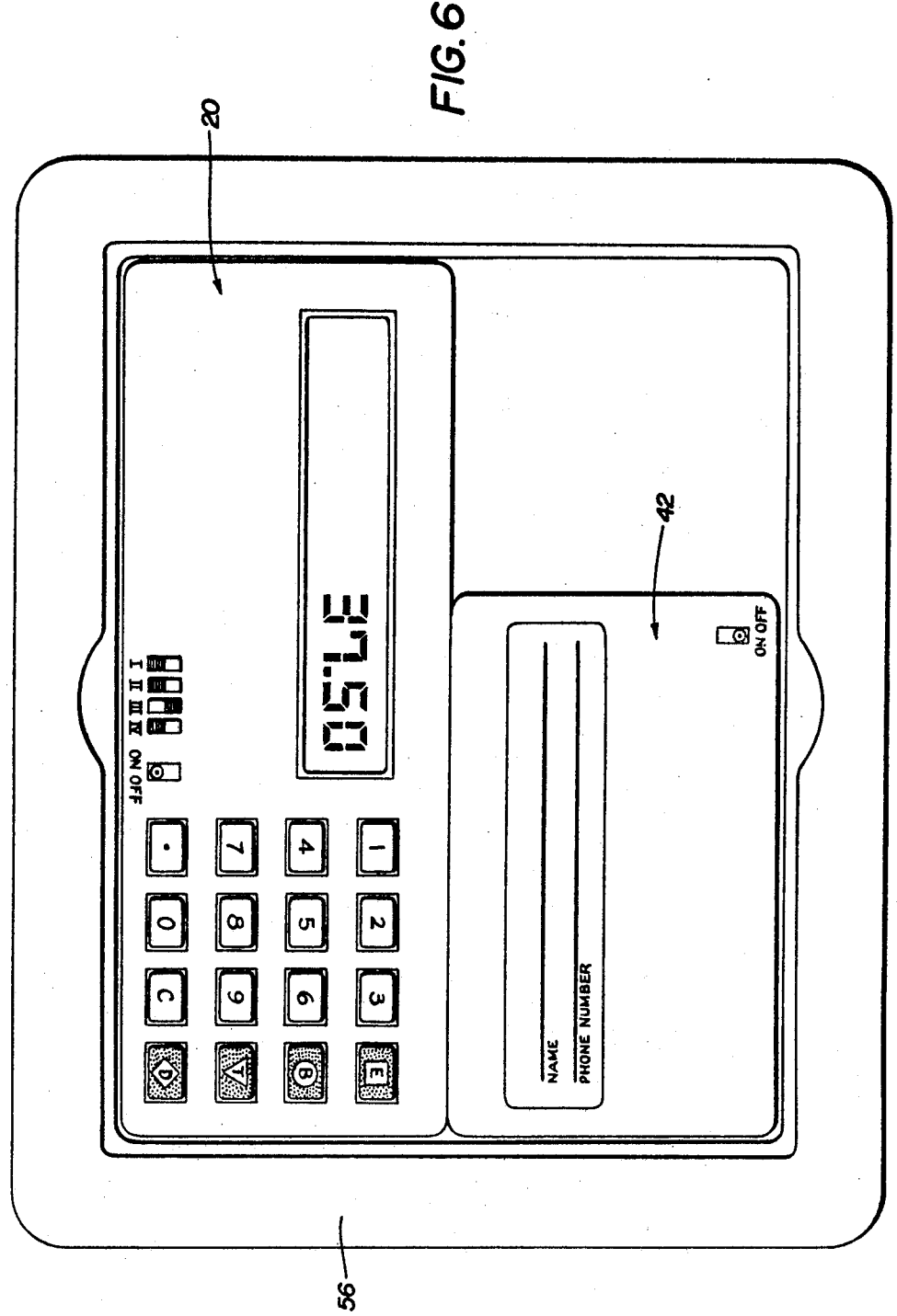
FIG. 6 shows first and second type transaction modules in position within an alignment pad for completing a transaction.

As another possibility, mentioned briefly above, each track of memory can correspond to a separate account maintained by individuals within a subgroup, such as a single family. For example, a parent may provide four separate accounts for his children, provide each child with his own module and periodically supply that child's track with a predetermined credit. The parent can thereby maintain close control upon expenditures made by the child and, if necessary, periodically output the contents of the track to be printed as a hard copy record. Preferably, the parent may be in possession with one of the first type modules 20, with each child being supplied with a second type module 42. The module 42 carried by each child will be internally programmed to respond to a separate track of funds transfer data. Periodically, the contents of the second type module carried by each child is monitored by the parent module by mating the two modules in an alignment pad 56, as shown in FIG. 6. In the example shown, the module 20 is controlled to operate on track 3 by the position of switches 30; the module 42 is internally programmed to operate on track 3. Thus, the parent can periodically monitor the account balance, whereas the account balance is not visible to the child or to other individuals. The parent can, at this time, increment the account of the module 42 or increment the account balances of other modules 42 by simply changing the position of switch 30 to the track corresponding to each individual module.

Although the operation of modules 20 and 42 have been described in context of a family environment, it is understood that the module 42 can be be used in any other environment, wherein the amount of each transaction tends to be small and wherein it is not necessary to process a personal identification number, and wherein it is further not necessary to retain detailed records of each transaction.

Figure 7:
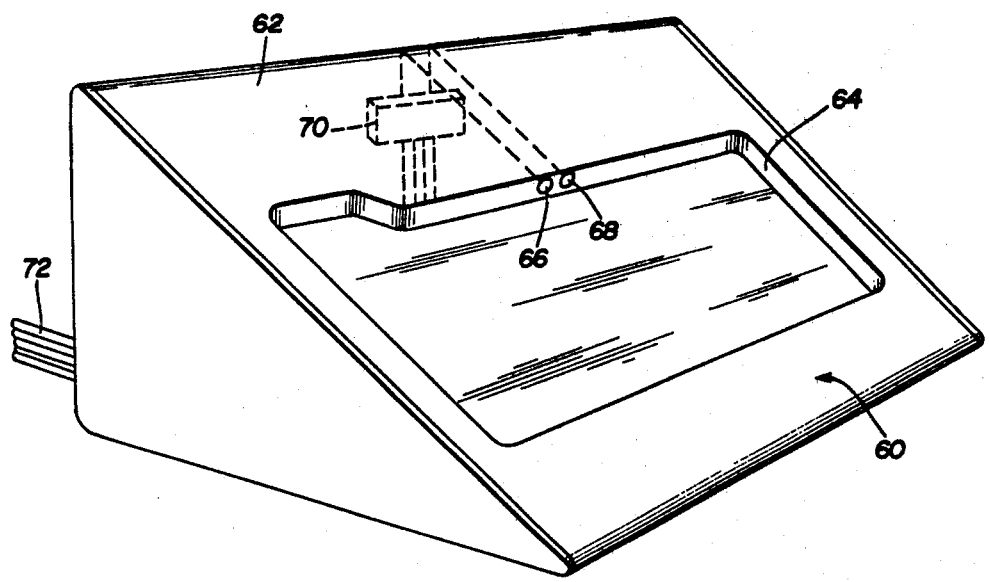
FIG. 7 is a perspective view of a communication pad adapted to couple transaction data between a module and a point of sales terminal or central processing unit.
Figure 8:
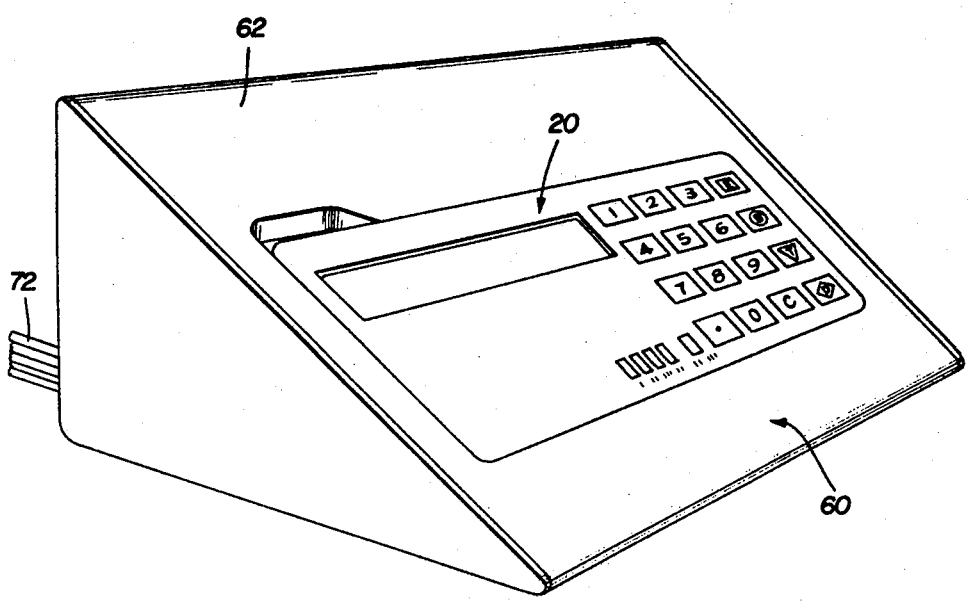
FIG. 8 shows a first type funds transfer module in position within the communications pad of FIG. 7.

Referring to FIG. 7, a pad (communications pad) for establishing bidirectional communications between an optical module 20 and a point of sale terminal or central processing unit via the telephone lines, identified by 60, comprises a housing 62 formed with a recess 64 configured to receive a single module 20 (see FIG. 8). Located at one sidewall of recess 64 are an optical receiver 66 and optical transmitter 68 positioned in alignment with transmitter 32 and receiver 34 of the module 20 (see FIG. 1). The receiver 66 and transmitter 68 are connected to an interface board 70 within housing 60 to processing signals to be applied on bus 72. This pad 60 can be used to establish communication between the portable module 20 and a central computer located at the authorizing institution (bank) or by another entity, such as a remote vendor or vendee equipped with a similar pad 60.

Figure 9:
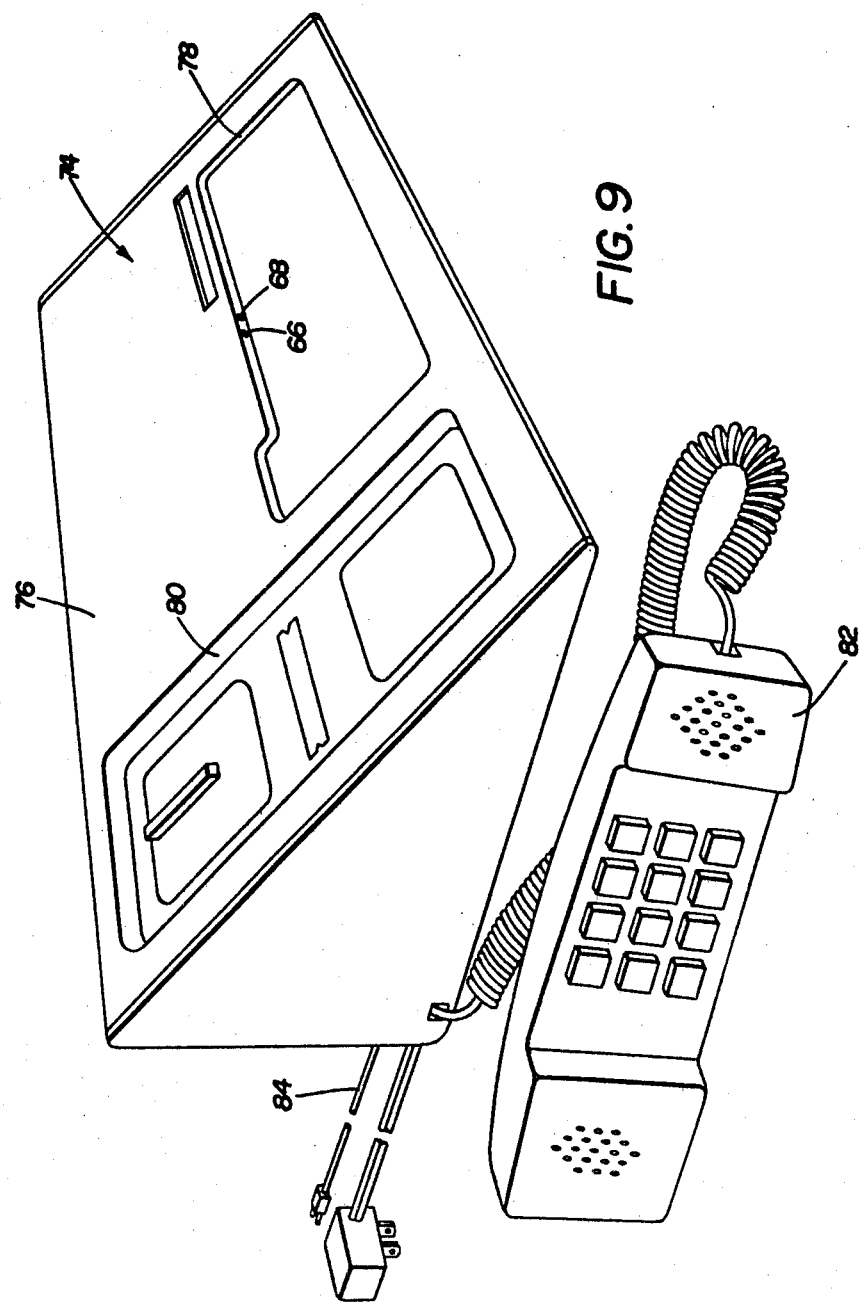
FIG. 9 is a perspective view of a telephone modem adapted to receive a funds transfer module, in accordance with the invention.

Referring now to FIG. 9, a modem (modulator-demodulator) 74 comprises a housing 76 formed with a first recessed area 78, similar to the recess 74 in FIG. 7, to receive a module 20, including optical receiver 66 and optical transmitter 68. The housing 76 also includes a second recessed area 80 forming a carriage for a telephone handset 82. Data from the module 20 as well as data from the telephone handset 82 are coupled onto data bus 84 to be transmitted, via the telephone lines, to a remote station, such as the authorizing institution. Thus modem 74 enables the operator, who may be the vendor, to establish voice communication with the authorizing institution as well as transmit and receive electronic funds transfer data via module 20. It is possible, for example, for the central station to be provided with conventional voice recognition circuitry that responds only to the voice of the authorized holder of module 20, as a further level of security. Voice communications can also be established between personnel at the central station and the user to assist with problems and to provide instructions.

Figure 10:
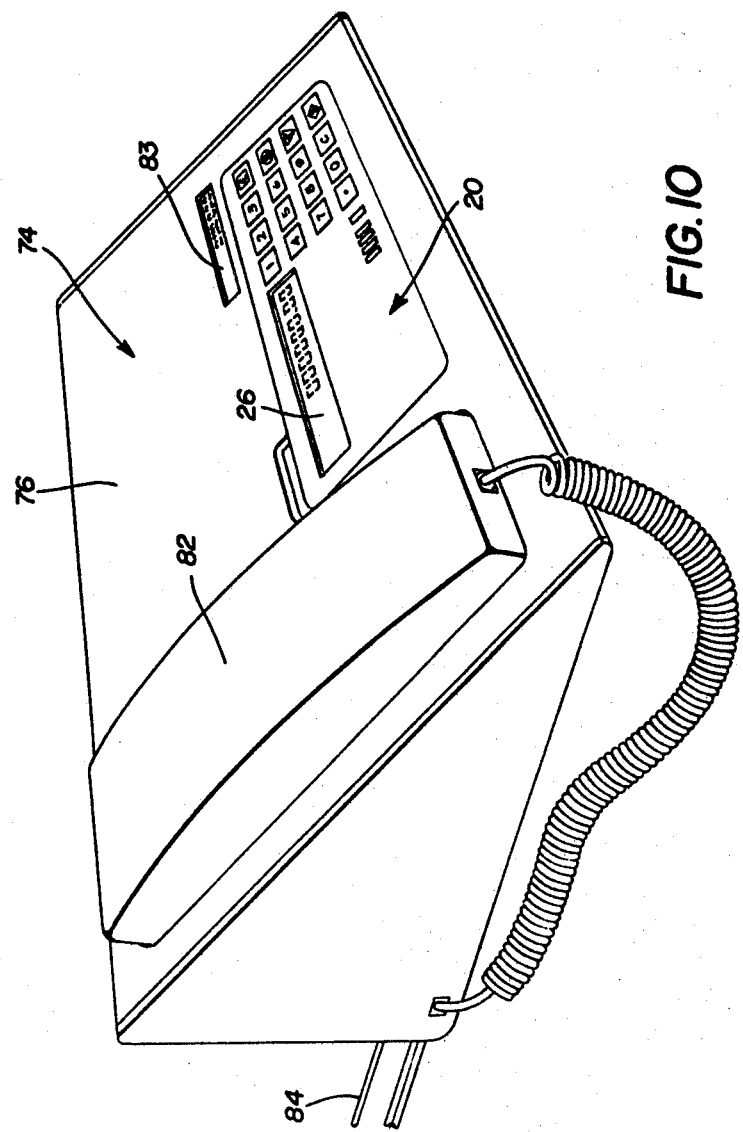
FIG. 10 shows a first type funds transfer module, in accordance with the invention, positioned within the modem of FIG. 9.

FIG. 10 shows the modem 74 with handset 82 positioned in cradle 80 and module 20 positioned within cradle 78. Data processed by the module 20 is displayed on 26; a second display 84 in modem housing 76 displays the telephone number dialed into handset 82; display 84 can be used to display other data.

Figure 11:
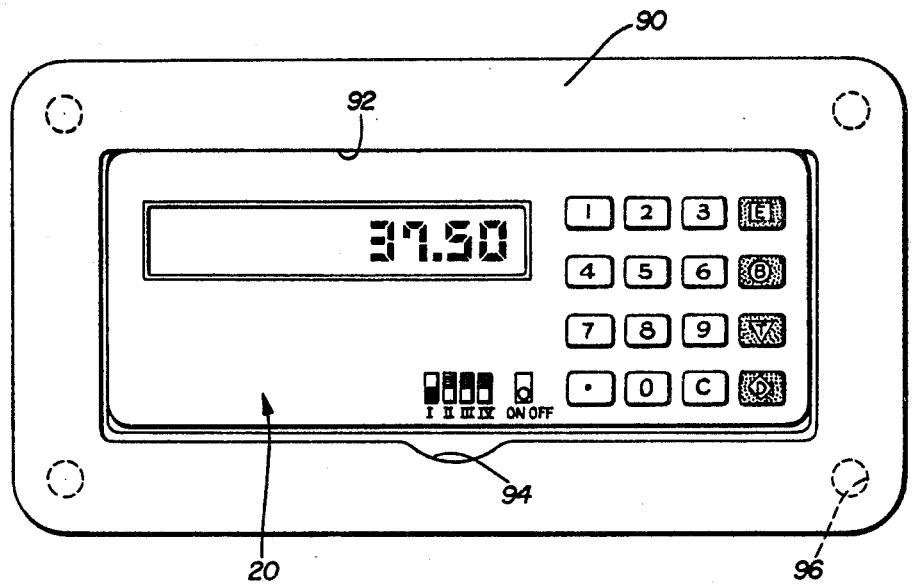
FIG. 11 is a top view of an alignment pad adapted to be mounted to an ATM or other device and carrying a first type funds transfer module, in accordance with the invention.

Referring to FIG. 11, a mounting pad 90 is provided with a recess 92 configured to receive a single module 20. The pad 90 is provided with optical coupling transmitter and receiver units (not shown) to establish an optical data link with the module 20, in a manner described above. A thumb slot 94 formed in one portion of the pad 90 enables the user to conveniently remove the module 20 from within the pad 90.

Of particular importance, the pad 90 is provided with fastening means, such as bolts 96, to enable the pad to be mounted or retrofitted to an external device, such as an automatic teller machine (ATM) or to a location at a point of sale, a gasoline pump, etc. To make a purchase or to use the automatic teller machine, the holder of module 20 inserts the module into the pad to establish bidirectional communications with a central station. The holder of the module 20 is thereby able to make a purchase or other transaction without intervention by a human vendor, teller or other entity.

Figure 12:
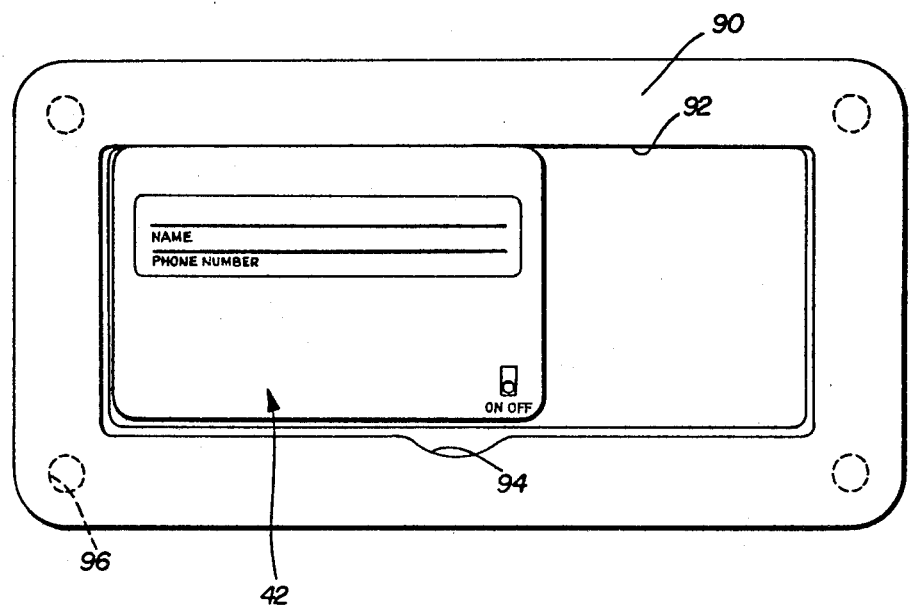
FIG. 12 shows the mounting pad of FIG. 11, carrying a second type funds transfer module in accordance with the invention.

Referring to FIG. 12, the pad 90, mounted on an external device as above, is capable of receiving and operating with a funds transfer module 42, and establishing bidirectional optical communications with a central station. Since module 42 has no keyboard, multiple position switch or display, the module 42 is capable of only decrementing by fixed amounts. This would be useful, however, in connection with large volume, fixed price, low cost transactions.

Figure 13A:
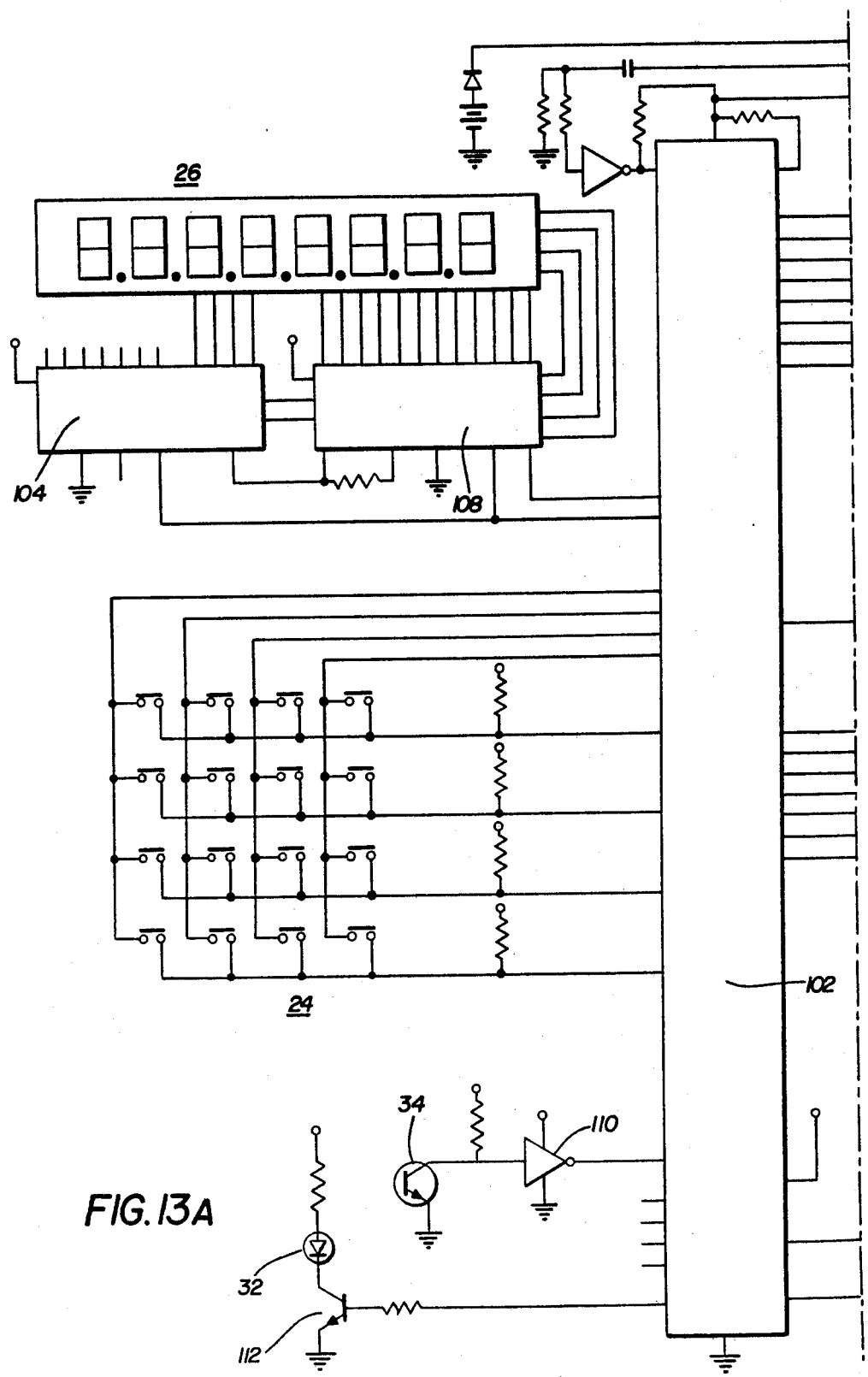
FIGS. 13a and 13b are detailed circuit diagrams showing the signal processing and storage circuitry contained within the first type funds transfer module.
Figure 13B:
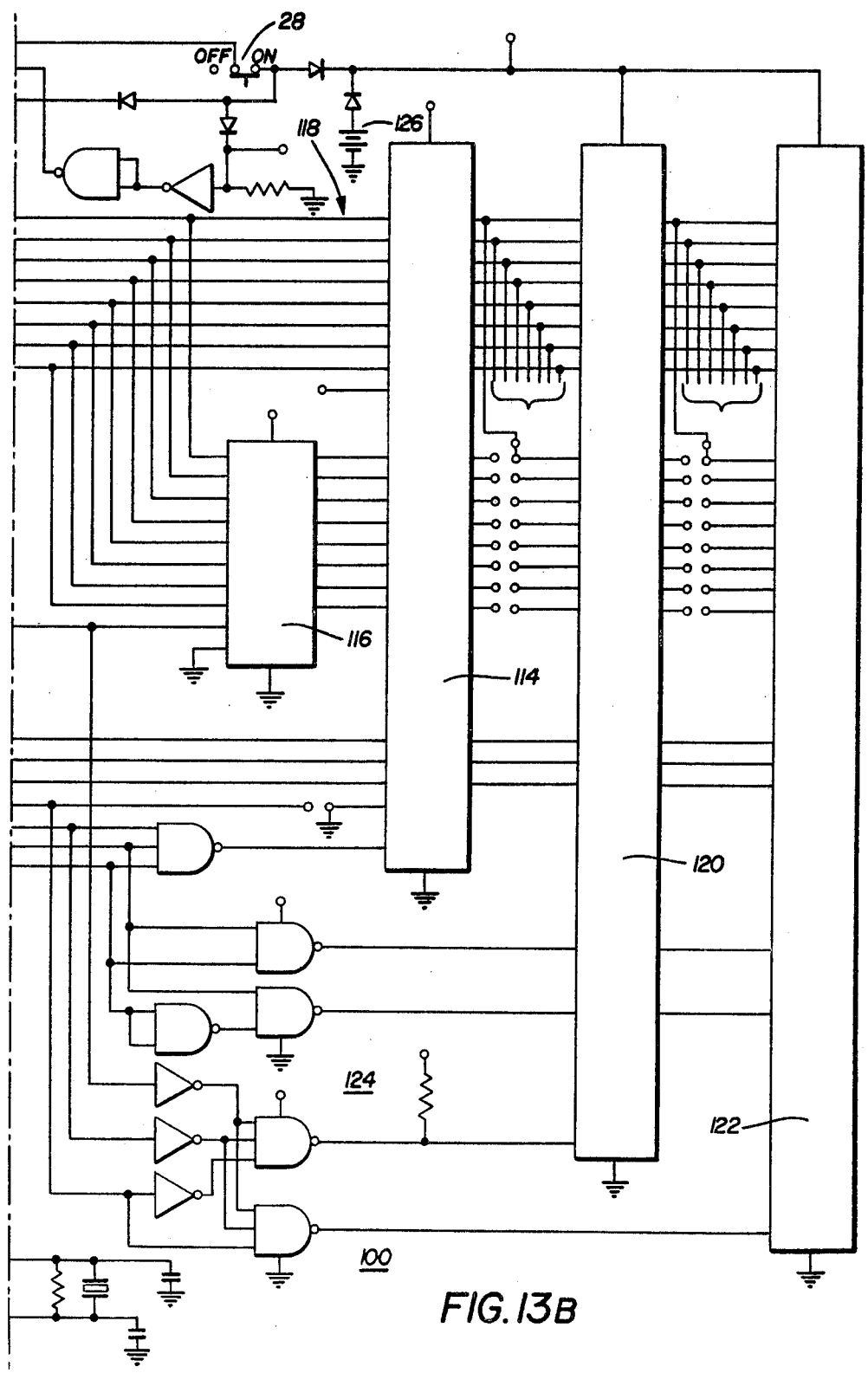

Referring now to FIG. 13, a circuit diagram of the data processing and storage circuitry within module 20 is illustrated. The circuitry, identified generally by 100, is based upon a conventional microprocessor 102, which may be a Motorola MC146805E2 CMOS 8-bit microprocessor, which belongs to the M6805 family of microcomputers. Details of the structure or operation of the microcomputer, being well known, shall not be given herein for brevity. Other types of microprocessors can be used; the microprocessor identified herein is preferred, however, for its very low power consumption.

The microprocessor receives, at terminals PA0-PA7, signals developed by keyboard 24 and generates signals at terminals at PB0 and PB1 to display 26. The keyboard entered signals are applied in bit parallel, whereas the display signals are generated in bit serial. The bit serial data generated by microprocessor 102 are decoded and applied to display 26 through conventional display drivers 104, 108. The display drivers may be a Motorola MC145001 and MC14500, respectively. Display 26 is preferably a conventional LCD display having an at least 8 digit capacity, compatible with the LCD display drivers 104 and 108.

Programming for the microprocessor 102 is developed in a conventional manner to provide the functions and operations described above, and shall not be provided in detail herein.

The microprocessor receives data from optical receiver 34 (assuming a type one module environment) at terminal PB7 following buffering by amplifier/inverter 110, and generates data at terminal PB6 to optical transmitter 32 through driver transistor 112. The optical receiver 34 may be an FPT700 NPN silicon transistor; the transmitter 32 may be an PFE700 gallium arsenide infrared emitter.

A masked PROM 114, which may be a National MC2716, contains inaccessible data, such as the personal identification number and sequence programming, addressed by microprocessor ports B0-B7 through a conventional latch circuit 116, which may be a Motorola type 74C373. Data are transferred between the microprocessor 102 and PROM 114 along data lines 118.

Four kilobytes of random access memory for storing account data and other data are provided by a first 2000 byte random access memory (RAM) 120 and a second identical memory 122. Each of the memories 120 and 122 may be provided by a Hitachi HM6116 integrated circuit.

Control of the memory functions (read, write, etc.) are provided by conventional logic circuitry 124, driven by microprocessor 102. Power for the circuit 100 is provided by a battery 126 through ON/OFF switch 28.

In this disclosure there is shown and described only the preferred embodiments of the invention, but, as aforementioned, it is to be understood that the invention is capable of using various other combinations and environments, and is capable of changes or modifications within the scope of the inventive concept as expressed herein.

I claim:

1. In a funds transfer system, a portable device for transferring transaction data among members, wherein each member is authorized to transact with other members within preestablished credit limits, the device comprising:

a housing;

data processing and storage circuitry inside said housing;

a keyboard on the housing for providing transaction data and other data entered via said keyboard by a member to said data processing and storage circuitry;

an optical transceiver means exposed through the housing for providing bidirectional transaction data to said data processing and storage circuitry; and alignment means for positioning said housing relative to a housing of a second similar portable device such that said optical transceiver means is in alignment with an optical transceiver means of said second portable device.

2. The system of claim 1, wherein said device includes a display for selectively displaying keyboard entered data and data stored in said data processing and storage circuitry.

3. The system of claim 1 or claim 2, wherein said alignment means includes at least one alignment member formed on said device housing.

4. The system of claim 3, wherein said alignment means includes at least one male member and complementary female member formed on said housing and adapted to mate with corresponding members formed in the housing of the second portable device.

5. The system of claim 1, wherein said data processing and storage circuitry of said portable device includes memory means, said memory means being adapted to receive different types of transaction data for storage in different portions of said memory means.

6. The system of claim 5, including manual switching means on said housing, and means responsive to said switching means for bidirectionally processing data with respect to a portion of said memory means selected by said switching means.

7. The system of claim 3, wherein said alignment means includes an alignment pad adapted to receive a pair of said portable devices, including means for positioning said pair of portable devices relative to one another with the optical transceiver means of said devices in optical communication with each other.

8. The system of claim 7, wherein said alignment pad includes a surface, and a recess formed in the said surface having a size and configuration corresponding to the size and configuration of a pair of said portable devices positioned with the optical transceiver means of said devices in optical communication with each other.

9. The system of claim 1, including a mounting pad for receiving said portable device, said mounting pad including an optical transceiver means in alignment with the optical transceiver means of said portable device when said portable device is seated within said mounting pad; and said mounting pad having means for securing said pad to an external device, such as an automatic teller machine (ATM).

10. A system for performing funds data transfer in lieu of cash transactions, comprising first and second identical transaction modules, each of said modules including a housing, data processing and storage circuitry within said housing; a keyboard on said housing for entering transaction and other data; display means for displaying data selectively entered via said keyboard and data stored in said data means in circuit with said data processing and storage circuitry and exposed through said housing; and means for temporarily orienting said identical transaction modules in an orientation wherein the transceiver means of the transaction modules are in optical alignment with one another.

11. The system of claim 10, including programming means in each of said transaction modules to establish a handshaking protocol between said two identical transaction modules in optical communication to establish a transaction link.

12. The system of claim 10, wherein each of said identical transaction modules includes a multiple position switch on said housing and said data processing and storage circuitry includes a memory means, said circuitry further including means responsive to said multiple position switch for storing transaction data selectively in predetermined different portions of said memory means depending upon transaction type.

13. A system for enabling data transfer among members of a cooperative, wherein at least some of said members receive a portable data transfer module of a first type or of a second type; said first type portable data transfer module including a first housing, data processing and storage circuitry within said first housing, keyboard means on the housing for entering data to said data processing and storage circuitry; a display on said housing for selectivly displaying data entered via said keyboard means and data stored in said data processing and storage circuitry and first optical transceiver means exposed through said housing coupled to said data processing and storage circuitry; said second type portable data transfer module including a second housing smaller than said first housing; data storage and processing circuitry within said second housing and second optical transceiver means exposed through said second housing and in circuit with said data storage and processing circuitry within said second housing, said first and second housings containing alignment means for orienting modules of said first and second types in an orientation wherein said first and second optical transceiver means are in optical alignment with each other.

* * * * *